Nov. 24, 1959　　　J. F. DEMPSEY　　　2,914,588
MANUFACTURE OF ISOPRENE
Filed March 11, 1957
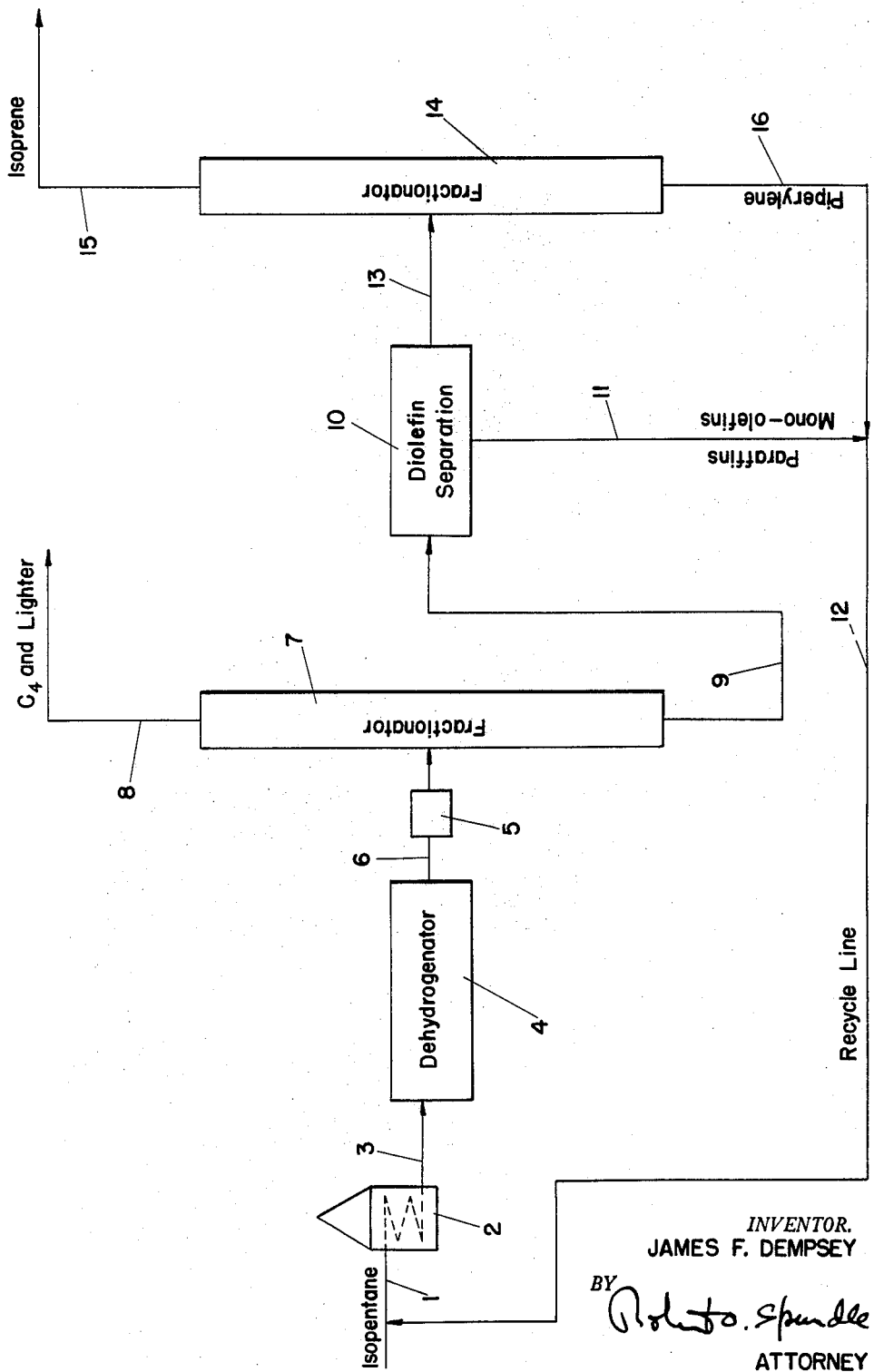
INVENTOR.
JAMES F. DEMPSEY
BY
ATTORNEY

United States Patent Office 2,914,588
Patented Nov. 24, 1959

2,914,588

MANUFACTURE OF ISOPRENE

James F. Dempsey, Claymont, Del., assignor to Sun Oil Company, Philadelphia, Pa., a corporation of New Jersey Application March 11, 1957, Serial No. 645,352

2 Claims. (Cl. 260—680)

This invention relates to the manufacture of isoprene, and more particularly to an improved process for the direct conversion of isopentane to isoprene by catalytic dehydrogenation.

Processes for the production of isoprene by catalytic dehydrogenation of isopentane have heretofore been proposed. In all such processes of which I have knowledge, some piperylene is produced, in addition to the desired isoprene. In such processes, the reaction products are separated into isoprene, piperylene, unreacted isopentane, isopentene and lower boiling reaction products. The unreacted isopentane, together with the isopentene, is recycled to the dehydrogenation step in admixture with make-up isopentane. Since, at the present time, there is no substantial commercial demand for piperylene as a chemical intermediate, it is generally used as plant fuel, since, due to its gum-forming tendencies, it cannot be used as a gasoline component.

Heretofore it has generally been believed that no useful purpose could be served by recycling piperylene to the dehydrogenation reactor along with the other recycle components, since it could not be expected that it could be converted to isoprene, and, in fact, the thought has been that the presence of piperylene in the recycle would be detrimental, since it would only act as a diluent, thus reducing the amount of fresh isopentane that could be charged to the reactor, and lowering the quantity of isoprene that could be produced in a given time.

I have now discovered that, contrary to the prior belief, the presence of piperylene in the feed to a process for dehydrogenating isopentane to isoprene has definite advantages. I have found that if all the $C_5$ hydrocarbons in the dehydrogenation reaction product, with the exception of isoprene, are recycled to the dehydrogenator, along with fresh feed, that an equilibrium reaction is soon arrived at in which there is no net production of piperylene, the selectivity of the reaction as expressed by the equation:

$$\text{Selectivity} = \frac{\text{wt. isoprene in product} \times 100}{\text{wt. isopentane converted}}$$

is greatly increased, and surprisingly, there is no significant loss in production of isoprene on an hourly basis, since the inhibition of piperylene formation counterbalances the smaller actual conversion of isopentane.

In the practice of the present invention, an isopentane feed is contacted at a temperature of from about 900° F. to about 1200° F. with a dehydrogenation catalyst such as an oxide of a group VI metal. A particularly desirable catalyst is activated alumina on which is distended from about 2% to about 10% chromia. The dehydrogenation may be carried out at atmospheric pressure, but subatmospheric pressures in the order of 5 to 10 inches of mercury absolute are preferred, since more efficient conversion of isopentane is had at these lower pressures. Space rates (liquid volume of feed/volume of reactor/hr.) from 0.5 to 5 may advantageously be used.

The effluent from the dehydrogenation reactor is then treated to recover isoprene from unreacted isopentane and other reaction products. For example, the products may be fractionally distilled to remove $C_4$ hydrocarbons and lower boiling materials, and the $C_5$ hydrocarbons may then be extractively distilled, using acetone as the extractant, to take overhead paraffins and most of the mono-olefins. The bottoms, comprising isoprene, 2-methyl-2 butene and piperylene, is then superfractionated to yield a high purity isoprene as an overhead product, and piperylene and 2-methyl-2 butene as bottoms. Another method of separation is to react the $C_5$ fraction with $SO_2$ to form sulfones from the diolefins present, followed by separation of the sulfones from the paraffins and mono-olefins, regeneration of the diolefins from the sulfones by heating, and fractionation of the diolefins to yield isoprene and piperylene. Still another method is to extract $C_5$ fraction with a solution of a copper salt such as copper ammonium acetate to complex the diolefins with the copper salt, followed by steam stripping to recover diolefins from the complex, and fractionation of the diolefins to yield isoprene and piperylene fractions. Since these, and other methods, for separating isoprene from mixtures of other $C_5$ hydrocarbons are well known to the art and form no part of the present invention, it is believed that any detailed discussion of any one of them would be surplusage, and would not in any way contribute to an understanding of the present invention. Such discussion will therefore be dispensed with.

In any event, no matter how the isoprene is separated from the other $C_5$ hydrocarbons, all of the $C_5$ hydrocarbons in the dehydrogenation product with the exception of isoprene are recycled to the dehydrogenation reactor in admixture with fresh isopentane feed. It will be found that the piperylene content of the mixed feed will rise from an initial value of 1 or 2 percent, when recycle is first started, to a value of from about 20 to about 30 percent, depending on the severity of the conditions in the dehydrogenator. When the piperylene content of the feed reaches this value, there will no longer be any net production of piperylene, all of the diolefin formed in the dehydrogenation reaction being the desired isoprene. It will be understood that as the piperylene content of the feed rises, the volume of recycle also rises, so that flow of fresh isopentane to the reactor must be lessened in order to maintain a constant space rate in the reactor.

In order that those skilled in the art may more fully appreciate the nature of my invention and a method of carrying it out, it will be more specifically described in connection with the accompanying drawing, which is a flow sheet of one form of the invention.

In starting up operation in accordance with the invention, an isopentane feed stock is taken through line 1 and is passed to furnace 2 in which it is heated to a temperature of 1100° F. The feed is then passed through line 3 to dehydrogenator 4, which is packed with a catalyst consisting of chromia deposited on activated alumina. The space rate, as defined above, is 1.4. Pressure in dehydrogenator 4 is maintained at 7 inches of mercury absolute by means of eductor 5 located in exit line 6. Effluent from dehydrogenator 6 is passed to fractionating tower 7, from which hydrocarbons and other products lighter than $C_5$ are taken overhead through line 8 for further processing. A bottoms product comprising $C_5$ paraffins, olefins, and diolefins is removed from fractionator 7 through line 9 and is passed to diolefin separation zone 10, in which the diolefins are separated from unreacted isopentane and mono-olefins formed in dehydrogenator 4 in any manner known to the art. These latter compounds are removed from diolefin separation zone 10 via line 11, and are recycled to admixture with fresh feed via recycle line 12. Diolefins are removed from diolefin separation zone 10 and are passed through line 13 to super-fractionator 14, from which isoprene is removed as an overhead product through line 15, while piperylene is removed as bottoms through line 16, is mixed with paraffins and mono-olefins from line 11 and is recycled together therewith through line 12 to admixture with fresh feed.

When starting up the process, the feed to dehydrogenator 4 will be essentially pure isopentane, but as the operation continues, the piperylene content of the feed to dehydrogenator 4 will build up under the reaction conditions given above until it reaches about 28 percent by weight, after which it will remain constant. During this time, the amount of recycle will gradually build up, and it will be necessary to gradually decrease the amount of fresh isopentane introduced through line 1 in order to maintain the space velocity in dehydrogenator 4 at a constant value. When the process has reached equilibrium, the flow of fresh isopentane through line 1 will be about one-fifth of the original volume.

In order to demonstrate the superior results obtained by proceeding according to the present invention over those achieved by proceeding according to the prior art, comparative data is given in the following table. In the table, case A is an equilibrium process according to the prior art, that is, only paraffins and mono-olefins in the reaction product are recycled. Case B is a process according to the present invention, in which piperylene is recycled in addition to paraffins and mono-olefins.

*Table I*

|  | Case A | Case B |
|---|---|---|
| Catalyst | Chromia on Alumina. | Same. |
| Space Rate | 1.4 | Do. |
| Temperature | 1058° F | Do. |
| Pressure | 7 in. Hg Absolute. | Do. |
| Feed Composition, Wt. Percent: |  |  |
| Isopentane | 72.7 | 52.6. |
| Normal $C_5$ | 1.5 | 1.1. |
| Isopentenes | 25.8 | 18.6. |
| Piperylene | None | 27.7. |
| Product Composition, Wt. Percent Feed: |  |  |
| $H_2$ | 2.4 | 1.7. |
| $C_1$-$C_4$ and n-$C_5$ | 7.4 | 5.4. |
| Isopentane | 45.2 | 32.6. |
| Isopentenes | 25.8 | 18.6. |
| Isoprene | 12.0 | 11.9. |
| Piperylene | 4.5 | 27.7. |
| Coke | 2.7 | 2.1. |
| Selectivity | 43.6 | 59.5. |

As may be observed from the foregoing, in case A 4.5% of the feed was converted to the undesired piperylene, whereas in case B there is no net production of piperylene. In case A only 43.6% of the isopentane converted went to isoprene, whereas in case B 59.5% of the isopentane reacted was converted to isoprene. In case A 27.5% of the feed was make-up isopentane, and in case B but 20% of the feed was make-up isopentane, yet the production of isoprene was essentially the same in each case.

The invention claimed is:

1. A process for the production of isoprene which includes passing a feed stock comprising isopentane and from about 20% to about 30% piperylene to a dehydrogenation zone, contacting it therein with a dehydrogenation catalyst at a temperature of from about 900° F. to about 1200° F., recovering a reaction product, separating the reaction product into isoprene, other five carbon hydrocarbons including piperylene, and lower boiling materials, and recycling all the five carbon hydrocarbons, with the exception of isoprene, to the dehydrogenation zone in admixture with fresh isopentane in an amount sufficient to replace that converted in the dehydrogenation zone.

2. In the catalytic pyrolysis of isopentane for the production of isoprene, the improvement which comprises effecting the pyrolysis in the presence of from about 20% to about 30%, based on the feed to the process, of added piperylene.

References Cited in the file of this patent

UNITED STATES PATENTS

| 2,401,973 | Seyfried et al. | June 11, 1946 |
| 2,831,042 | Sieg | Apr. 15, 1958 |

OTHER REFERENCES

Mavity et al.: National Petroleum News, vol. 37, No. 14, Apr. 4, 1945, pp. R-263, R-266, R-268, R-270 and R-272.